US012717064B2

(12) United States Patent
Norbeck et al.

(10) Patent No.: US 12,717,064 B2
(45) Date of Patent: Aug. 25, 2026

(54) METHOD FOR DETERMINING THE HEAT IN PLACE FOR A GEOTHERMAL SYSTEM WITH HORIZONTAL WELLS

(71) Applicant: Fervo Energy Company, Houston, TX (US)

(72) Inventors: Jack Norbeck, Golden, CO (US); Katharine Voller, Mc Kees Rocks, PA (US); Steven Fercho, Reno, NV (US); Emma G. McConville, Reno, NV (US); Aleksei Titov, Golden, CO (US); Sireesh Dadi, Houston, TX (US); Christian Gradl, Houston, TX (US)

(73) Assignee: Fervo Energy Company, Houston, TX (US)

( * ) Notice: Subject to any disclaimer, the term of this patent is extended or adjusted under 35 U.S.C. 154(b) by 0 days.

(21) Appl. No.: 19/151,177

(22) PCT Filed: Nov. 27, 2023

(86) PCT No.: PCT/US2023/081215
§ 371 (c)(1),
(2) Date: Jul. 25, 2025

(87) PCT Pub. No.: WO2024/158462
PCT Pub. Date: Aug. 2, 2024

(65) Prior Publication Data

US 2026/0118548 A1 Apr. 30, 2026

Related U.S. Application Data

(60) Provisional application No. 63/441,753, filed on Jan. 27, 2023.

(51) Int. Cl.
*E21B 44/00* (2006.01)
*E21B 7/04* (2006.01)
(Continued)

(52) U.S. Cl.
CPC .............. *G01V 20/00* (2024.01); *E21B 7/046* (2013.01); *E21B 43/305* (2013.01); *E21B 47/07* (2020.05); *G01V 9/005* (2013.01)

(58) Field of Classification Search
CPC ...... E21B 2200/20; E21B 43/26; E21B 44/00; E21B 7/046; E21B 7/04; E21B 7/10; E21B 47/07; G01V 20/00
See application file for complete search history.

(56) References Cited

U.S. PATENT DOCUMENTS

2012/0203525 A1* 8/2012 Rodriguez Herrera ...................... E21B 47/022 703/2
2012/0292026 A1 11/2012 Brooks
(Continued)

FOREIGN PATENT DOCUMENTS

CN 107829684 A 3/2018
WO WO-2024158462 A1 8/2024

OTHER PUBLICATIONS

"International Application Serial No. PCT/US2023/081215, International Search Report mailed Mar. 15, 2024", 3 pgs.
(Continued)

*Primary Examiner* — Kipp C Wallace
(74) *Attorney, Agent, or Firm* — Schwegman Lundberg & Woessner, P.A.

(57) ABSTRACT

Systems and techniques may be used for identifying geology, state of stress, or heat in place for a horizontal well. An example technique may include generating a 3D geologic model or a 3D temperature model of a horizontal well, receiving an indication of an orientation of a stress field in the horizontal well, and optionally drilling the horizontal well using the 3D geologic model, the 3D temperature model, or the indication of the orientation of the stress field. The example technique may include iteratively updating the
(Continued)

3D geologic model or the 3D temperature model of the horizontal well, for example based on in-well data.

16 Claims, 12 Drawing Sheets

(51) Int. Cl.

| | |
|---|---|
| ***E21B 43/30*** | (2006.01) |
| ***E21B 47/07*** | (2012.01) |
| ***G01V 9/00*** | (2006.01) |
| ***G01V 20/00*** | (2024.01) |

(56) References Cited

U.S. PATENT DOCUMENTS

| | | | | |
|---|---|---|---|---|
| 2012/0325556 | A1* | 12/2012 | Luxey | E21B 49/00 175/40 |
| 2013/0238306 | A1 | 9/2013 | Lagenwalter et al. | |
| 2016/0003008 | A1* | 1/2016 | Uribe | E21B 43/30 166/250.01 |
| 2017/0145793 | A1* | 5/2017 | Ouenes | G06F 17/18 |
| 2018/0274524 | A1* | 9/2018 | Moncarz | F03G 4/06 |
| 2019/0345815 | A1* | 11/2019 | Mishra | E21B 47/09 |
| 2020/0049380 | A1* | 2/2020 | Cairns | E21B 43/162 |
| 2021/0048552 | A1* | 2/2021 | Wilson | E21B 47/07 |
| 2021/0302619 | A1* | 9/2021 | Al-Qahtani | E21B 47/022 |
| 2021/0349226 | A1* | 11/2021 | Alwehaibi | G01V 1/282 |
| 2022/0364439 | A1* | 11/2022 | Al-Huwaider | E21B 36/04 |
| 2023/0031116 | A1 | 2/2023 | He et al. | |
| 2024/0070346 | A1* | 2/2024 | Xia | E21B 41/00 |
| 2025/0251523 | A1* | 8/2025 | Fercho | G01V 3/083 |

OTHER PUBLICATIONS

"International Application Serial No. PCT/US2023/081215, Written Opinion mailed Mar. 15, 2024", 7 pgs.

Zhibo, et al., "Production features of steam and gas push: Comparative analysis with steam assisted gravity drainage", Petroleum Exploration and Development, vol. 38, Issue 1, [Online]. Retrieved from the Internet: <https://www.sciencedirect.com/science/article/pii/S1876380411600 l 65/pdf?md5=360ff8ffib728 | 850058d34e3668a3128&pid= l-s2.0-S18763804ll1600165-main.pdt>, (Feb. 2011), 79-83.

* cited by examiner

100

200

500

600

800

METHOD FOR DETERMINING THE HEAT IN PLACE FOR A GEOTHERMAL SYSTEM WITH HORIZONTAL WELLS

CROSS-REFERENCE TO RELATED APPLICATION

This application is a U.S. National Stage Filing under 35 U.S.C. 371 from International Application No. PCT/US2023/081215, filed on Nov. 27, 2023, and published as WO 2024/158462, on Aug. 2, 2024 which application claims priority to U.S. Provisional Patent Application Ser. No. 63/441,753, filed on Jan. 27, 2023, which applications and publications are incorporated herein by reference in their entirety.

STATEMENT REGARDING FEDERALLY SPONSORED RESEARCH OR DEVELOPMENT

This invention was made with government support under DE-EE0007080 awarded by the U.S. Department of Energy. The government has certain rights in this invention.

BACKGROUND

Geothermal energy systems typically use an injection well to introduce a cool injection fluid from the surface into a geothermal energy reservoir thousands of feet below ground. The geothermal energy reservoir is a formation such as a heated rock formation. As the injected fluid travels through the geothermal reservoir, the fluid absorbs heat increasing its temperature or enthalpy. One or more production wells are also disposed in the formation and are offset from the injection well so that the heated fluid may be pumped up from the formation to the surface where the heat may be extracted from the heated fluid to provide useable energy, often in the form of electricity. For example, a generator such as a steam turbine, Organic Rankine Cycle turbine, or other turbine may be used to convert the thermal energy entrained in the geothermal fluid into electricity. When geothermal power is generated using an Organic Rankine Cycle power plant, geothermal is a clean, renewable, zero-emission energy source.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Three-well drilling occurred as a Vertical Monitoring Well 73-22, a Horizontal Injection Well 34A-22, and a Horizontal Production Well 34-22, in or adjacent to the Blue Mountain geothermal field in Nevada, which is referred to herein. The project area intentionally targeted the hot (350° F. to 400° F.) and low-permeability, thermally conductive margins of the active hydrothermal system to demonstrate the feasibility of horizontal drilling and multistage stimulation in geothermal formations and at high-temperature conditions. The horizontal wells were strategically oriented to balance stable temperature along the laterals with optimal orientation to the local stress field. Three-dimensional temperature modeling and analysis of drilling induced fractures from offset well image logs successfully informed the well placements.

The lithologies encountered at the target depths of the laterals were Mesozoic metasediments composed of interlayered phyllite and quartzite intruded by diorite and granodiorite dike swarms. Drilling results from Vertical Monitoring Well 73-22, which targeted a location approximately at the midpoint of the laterals, confirmed the predicted temperatures and depth to Mesozoic basement, which informed the drilling program of the subsequent horizontal wells. The equilibrated temperature profiles of the horizontal wells were measured by both wireline logging and fiber optic sensing equipment installed permanently behind the casing in both wells. Following the stimulation treatment in Injection Well 34A-22, Production Well 34-22 was drilled through the stimulated reservoir volume. Acoustic and resistivity image logs were obtained along the lateral of Production Well 34-22, and numerous fractures were observed aligned with the maximum horizontal stress orientation suggesting the presence of tensile fractures created during the stimulation treatment. In addition, proppant samples were detected at numerous locations while drilling the lateral section of Horizontal Production Well 34-22, suggesting that proppant injected during the stimulation treatment on Injection Well 34A-22 was transported significant distances away from the wellbore. Heat-in-place estimates confirm that the stimulated reservoir volume created from the stimulation treatment in well 34A-22 was sufficiently large to enable approximately 5 MW of electric power production over a 10-year project life, consistent with the target well performance for the horizontal doublet geothermal well system. Data gained on both the regional and local state of stress was gathered to inform targeting of the lateral wells. Geology and temperature results of the drilling and use of the wells indicates successful implementation of the project.

Figure 1:
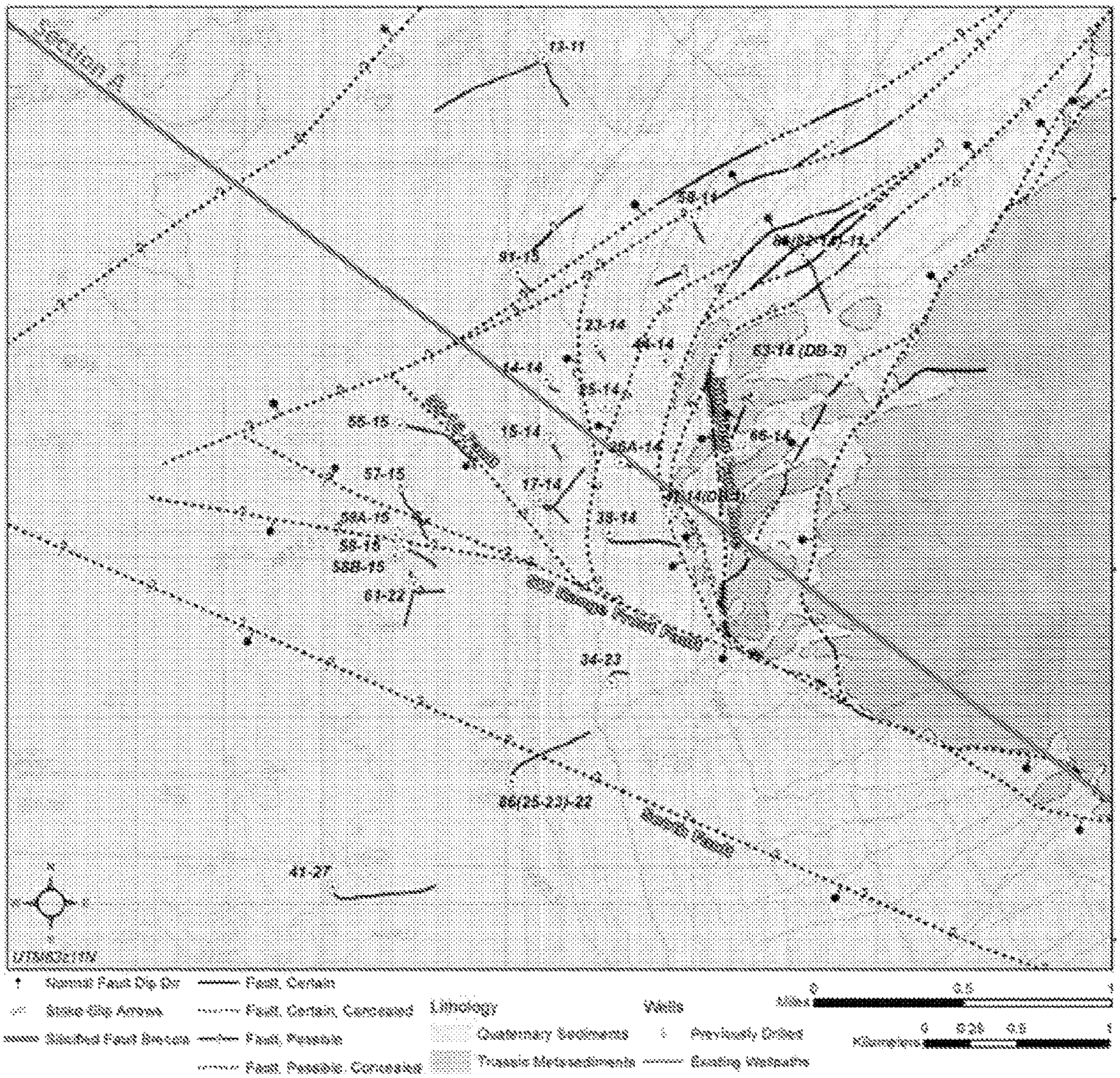
FIG. 1 illustrates a geologic and structural map of Blue Mountain Field including previously drilled deep wells in accordance with some examples.

FIG. 1 illustrates a geologic and structural map of Blue Mountain Field including previously drilled deep wells in accordance with some examples.

Previous studies of Blue Mountain define that the overall stratigraphic framework consists of Miocene to present basin-fill deposits overlying Mesozoic phyllite. The phyllite is intruded by multiple phases of igneous dikes/sills of likely Mesozoic and Tertiary ages. The range-front fault on the SW side of the Blue Mountain forms a prominent topographic break. On the NW side of Blue Mountain, silicified fault breccia is locally exposed in isolated outcrops surrounded by alluvium along the westernmost exposures of the surface trace of this fault as seen in FIG. 1. A westernmost exposure of this fault zone is silicified, and the silicification was interpreted to be relict. Kinematic data collected from fault surfaces along the western half of the range-front fault indicate dextral-oblique motion. Quaternary fault scarps were not observed in the alluvium along this range-front fault, supporting that either this fault has not ruptured since the middle Pleistocene and scarps are no longer preserved, or if younger scarps are present, they are subtle and might only be mapped with Lidar, a dataset which has not been available for this resource area.

The western nose of the Blue Mountain range is cut by multiple subparallel strands of arcuate normal and dextral-normal faults that splay from the range-front fault on the SW side of the range and wrap around to the range-front fault system on the northwest side of the range. There is also relatively widespread argillic alteration and localized silicification in the same area. One of these faults is particularly prominent, distinguished by massive silicification of fault breccia as seen in FIG. 1 along all exposures of the fault zone in the Mesozoic metasediments spanning 1.5 km in length along strike. It is possible that the silicification continues northward, but the fault trace is only exposed displacing quaternary surficial sediments. Two fault dip measurements were acquired along separate segments with dips of 61 to 68° E. The gentler of the two dipping surfaces also had good quality kinematic indicators, indicating dextral-normal offset on a NW-striking segment. This Silicified Fault Zone corresponds to the Central fault on the map also noted the extensive silicification. Based on field assessment in this study, there was no Quaternary fault scarp associated with this fault that cuts alluvium. There is, however, a sharp topographic break that is above the elevation of the Lake Lahontan high stand. This escarpment could be related to middle Pleistocene faulting or could be related to differential erosion across the Silicified Fault core.

Several faults were mapped east of the Silicified Fault Zone described above as seen in FIG. 1. Silicification was not observed along this fault zone. No fault surfaces were observed in this study or reported previously. The trace is based partly on some offset dikes and Mesozoic bedding offsets and partly on a major topographic break between the main range and a bench which extends west to the Silicified Fault previously described. The topographic break is consistent with an early to middle Pleistocene fault scarp. A possible late Pleistocene Quaternary fault scarp was also noted cutting alluvial fan sediments along a fault segment as seen in FIG. 1 between the East and Central faults as previously mapped.

Several fault strands were mapped west of the Silicified Fault, and in the West fault area. Fault drag was locally observed in the Mesozoic strata, with relative counterclockwise rotation of the Mesozoic fabric within 5 to 20 meters of some fault segments west of the Silicified Fault Zone. The exposures are erosion modified by the high stand of Lake Lahontan and it is difficult to determine which, if any have Quaternary fault scarps. Most of the WNW-striking sinistral faults and the NE-striking thrust faults that were mapped in the western part of the Blue Mountain range by could not be confirmed. NE-trending ridges are present, but these were interpreted by as erosional hogbacks with the primary bedding and primary foliation in the phyllite is parallel to these ridges. Part of the “Big Fault” of was observed east of the “East Fault”, but this could not be traced west. It is possible that additional faults and offsets in stratigraphy are present, but these would not be confirmed in the time available for fieldwork in this study. The overall expression of the range-front fault system on the NW side of the Blue Mountain range is different from the range-front on the south side in that it consists of multiple sub-parallel Quaternary-active strands covering an area 1-2 km wide as seen in FIG. 1. In the area near Blue Mountain Well 89-11, six parallel fault strands were mapped with fault scarps in the alluvium. One or two of these displace lacustrine sediments below the Lake Lahontan high stand, others are truncated by the shorelines. Fault surfaces were measured on several fault surfaces exposed in phyllite.

Based on the map pattern of the faults and kinematic data, the Blue Mountain geothermal system is associated with a displacement transfer zone. In this structural model, the range-front along the SW side of the range is dextral-normal. This fault dies out into the basin west of the nose of the range and dextral shear is transferred to NE-striking normal faults that accommodate NW-SE extension in the form of pure dip-slip motion along the NW side of the Blue Mountain range. In this type of model, deep circulation would most likely be controlled by the N to NE-striking normal faults, near where they intersect the NW-striking dextral-normal fault system. This could include faults associated with the relict alteration exposed at the surface and/or concealed faults in the basin. At the surface, a number of these fault segments are associated with relict alteration of Pliocene to early Quaternary age, a pattern which is relatively common for faults controlling deep circulation geothermal systems in the Basin and Range province.

Figure 2:
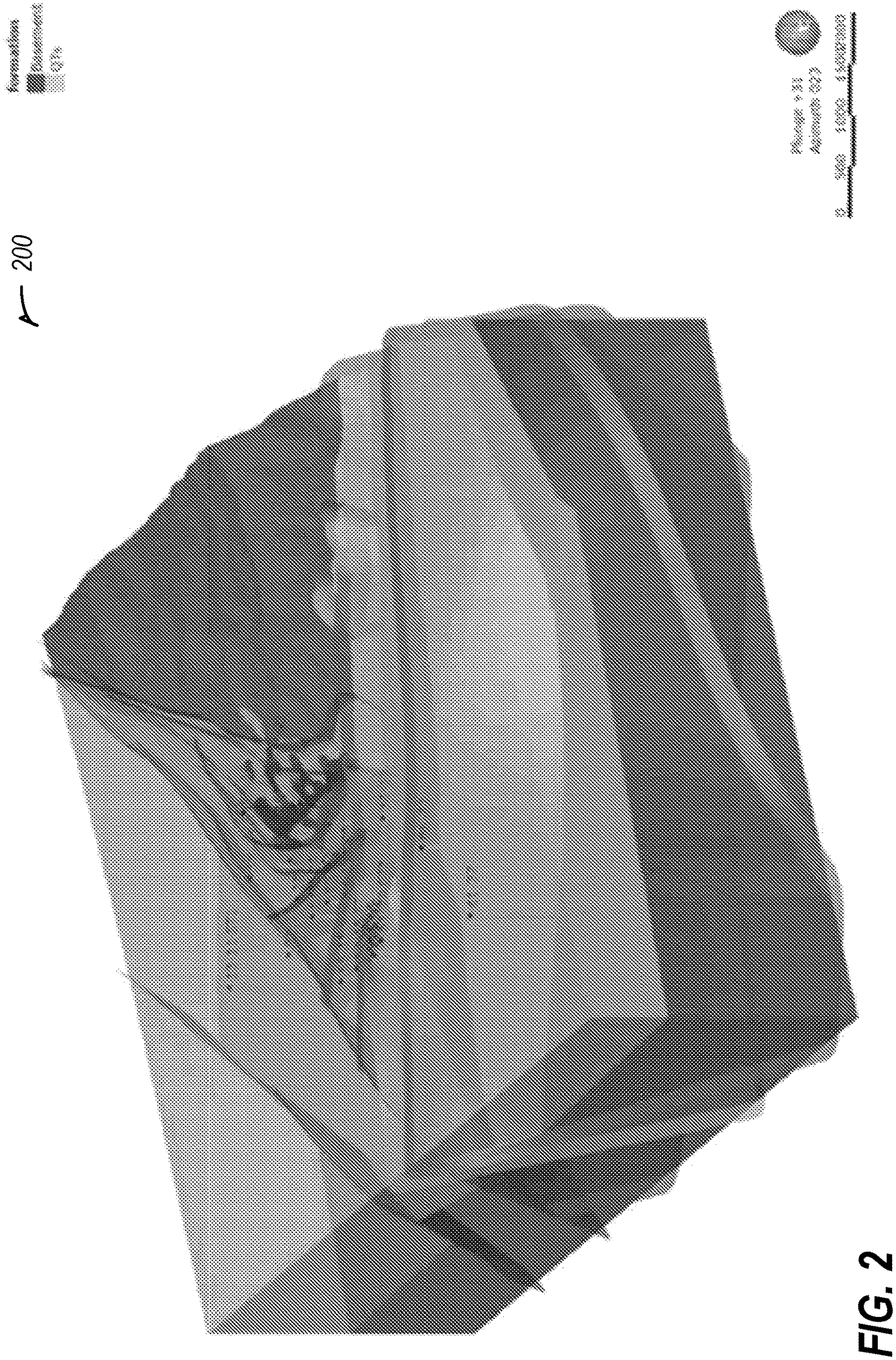
FIG. 2 illustrates an oblique view of the Blue Mountain three-dimensional geologic model in accordance with some examples.

FIG. 2 illustrates an oblique view of the Blue Mountain three-dimensional geologic model in accordance with some examples.

In order to better understand the subsurface and help with targeting of the wells at Blue Mountain, a faulted 3D geologic model was created by combining a surface mapping with data on lithologies, losses, and drilling breaks from the mudlogs from existing deep wells as seen in FIG. 2. The stratigraphic framework for the 3D model consists of Triassic metasediments that are intruded by Miocene (~12 ma) diorite dikes and overlain by late Tertiary through Quaternary basin fill sediments. For the basis of updating the 3D geologic model, the Triassic metasediments and Tertiary intrusives are lumped as one basement unit (Mz), and the late Cenozoic basin-fill sediments are lumped into a second unit (QTs).

Figure 3:
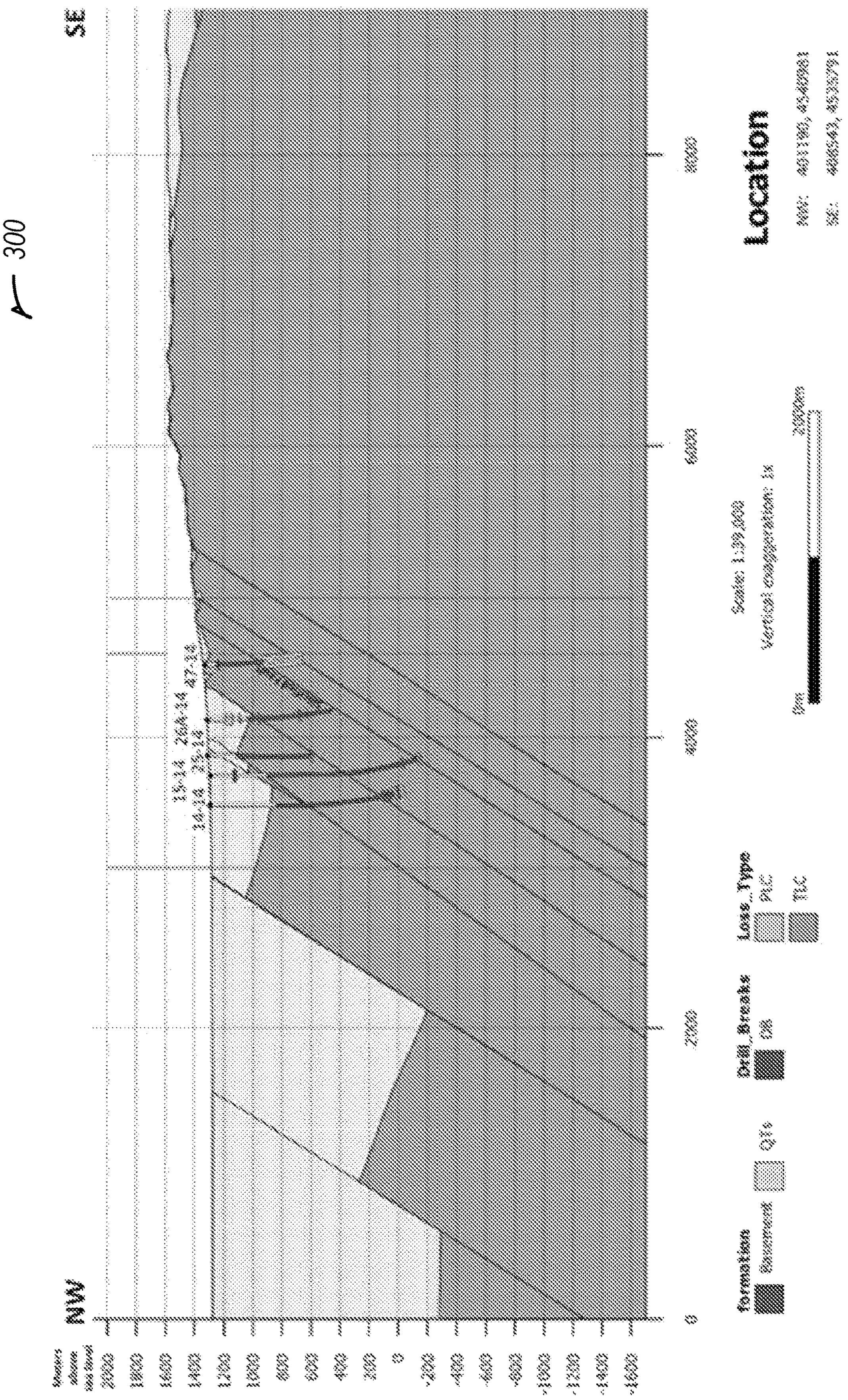
FIG. 3 illustrates a cross section of the position shown in FIG. 2 in accordance with some examples.

FIG. 3 illustrates a cross section of the position shown in FIG. 2 in accordance with some examples. Stratigraphic control from the well data shows that the basement progressively steps down to the NW, with the contact within each fault block gently dipping back towards the range front.

As is the case in most extensional settings, the wells located furthest out in the basin have the deepest depth to basement, especially 13-11 and 41-27 which are idle wells on the northern and southern margins of the field. The rest of the infield and nearfield wells show less variance in depth to basement as a function of distance to the range-front because faulting within the field is controlling the lithologic contacts. Stratigraphic control from the well data shows that the basement progressively steps down to the NW, with the contact within each fault block gently dipping back towards the range front. This Basin-and-Range style faulting is best demonstrated in section A as seen in FIG. 3. The NW, N, and NE-striking faults which drop basement down in the core of the field are truncated to the south by the SW range front fault, which strikes from SE to NW across the SW side of Blue Mountain and continues obscured under basin fill to the west. On the north end of the field, these core faults merge into the NW range front of Blue Mountain.

Figure 4:
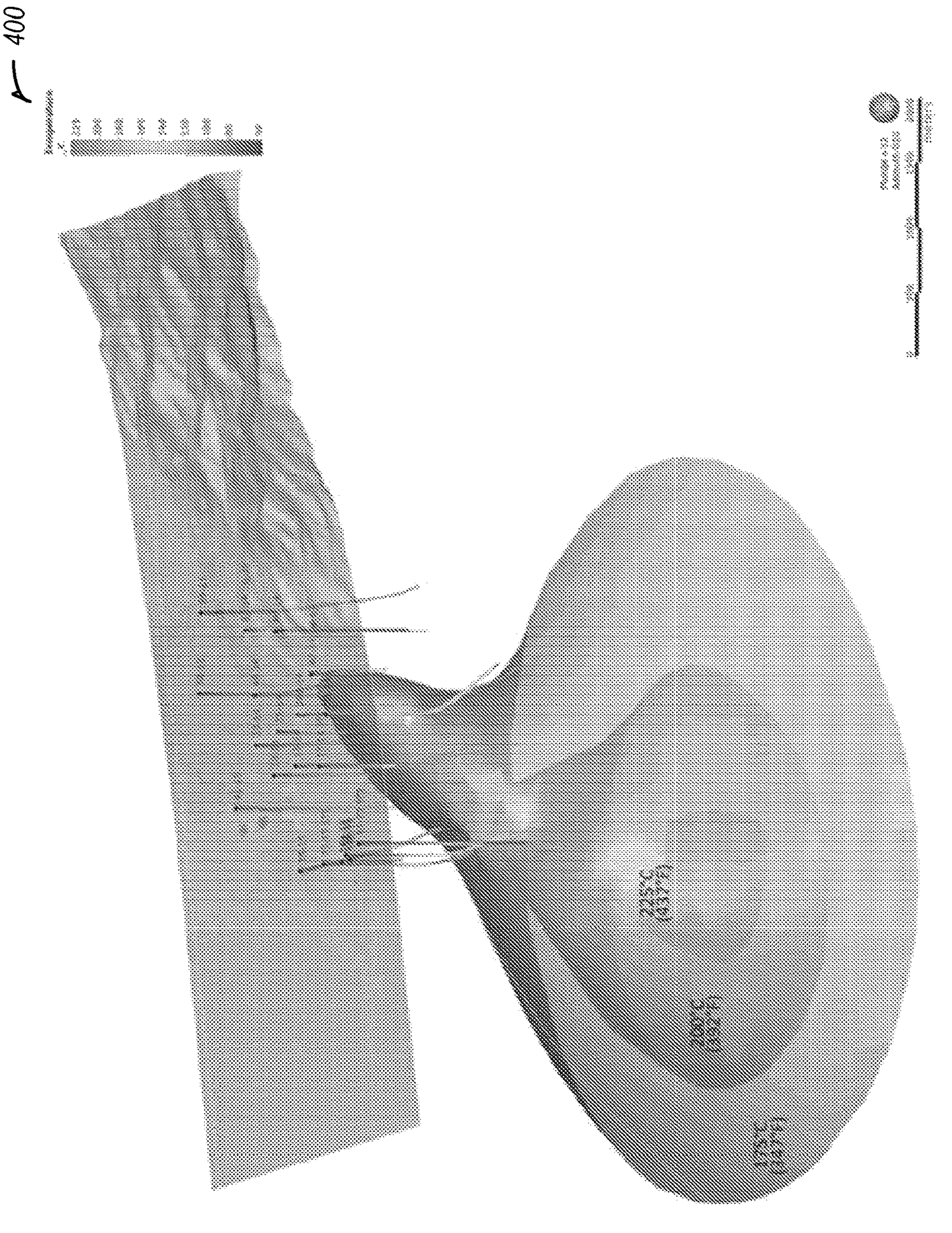
FIG. 4 illustrates an oblique view of highest temperature contours represented in the 3D temperature model of Blue Mountain in accordance with some examples.

FIG. 4 illustrates an oblique view of highest temperature contours represented in the 3D temperature model of Blue Mountain in accordance with some examples.

The available temperature logs for deep wells at Blue Mountain were plotted against elevation to normalize changes in measured depth due to directional drilling and to also be able to evaluate temperatures across common aquifers. The coolest wells in the field are 41-27, 13-11, 86-22, and 34-23, and have conductive profiles with gradients around 45° C./km (3.4° F./100 ft). This gradient corresponds to the average conductive gradient for the upper 3 km in the Basin and Range province. These wells can be considered outside the convective geothermal system and provide useful information in defining background conditions for the field. The remaining wells have higher initial gradients ranging from 60-200° C./km (4.3-12.0° F./100 ft) followed by abrupt changes to below 30° C./km (2.6° F./100 ft), characteristic of when wells enter partially convecting geothermal systems. Wells 63-14 and 38-14 both exhibit strong temperature reversals after reaching 160-180° C. (320-356° F.), indicative of outflow from the hydrothermal system. The hottest wells in the field are 57-15 and 58-15, with the latter having a maximum measured temperature of 218° C. (424° F.) and increasing gradient at bottom indicating the upflow may be 225° C. (437° F.) or more.

A 3D temperature model was created by importing the static temperature logs to Leapfrog Geothermal software and plotted along the directional well tracks as seen in FIG. 4. Three-dimensional interpolation of the temperatures was completed using the software's Radial Basis Function (RBF). RBF is an algorithm widely used for implicit surface modelling modeling and is well adapted for temperature distribution modeling. An initial raw model was created considering only measured temperature values as inputs and letting the RBF naturally contour temperatures in increments of 25° C. These were then projected to the cross sections (matching the geology section locations) which were used to review the model and draw 2D interpretive contours where needed that honor static well temperature data and make thermodynamic corrections for areas between and beyond the wells. Additionally, control points were added along the boundaries of the model to enforce a uniform 45° C./km (3.4° F./100 ft) background gradient around the model edges. These 2D control contours and control points were integrated into the 3D temperature model so that both the temperature interpretations and the static temperature points along the well bores were incorporated. Three dimensional contouring was completed at 25° C. intervals within the volume of the resource area.

Figure 5:
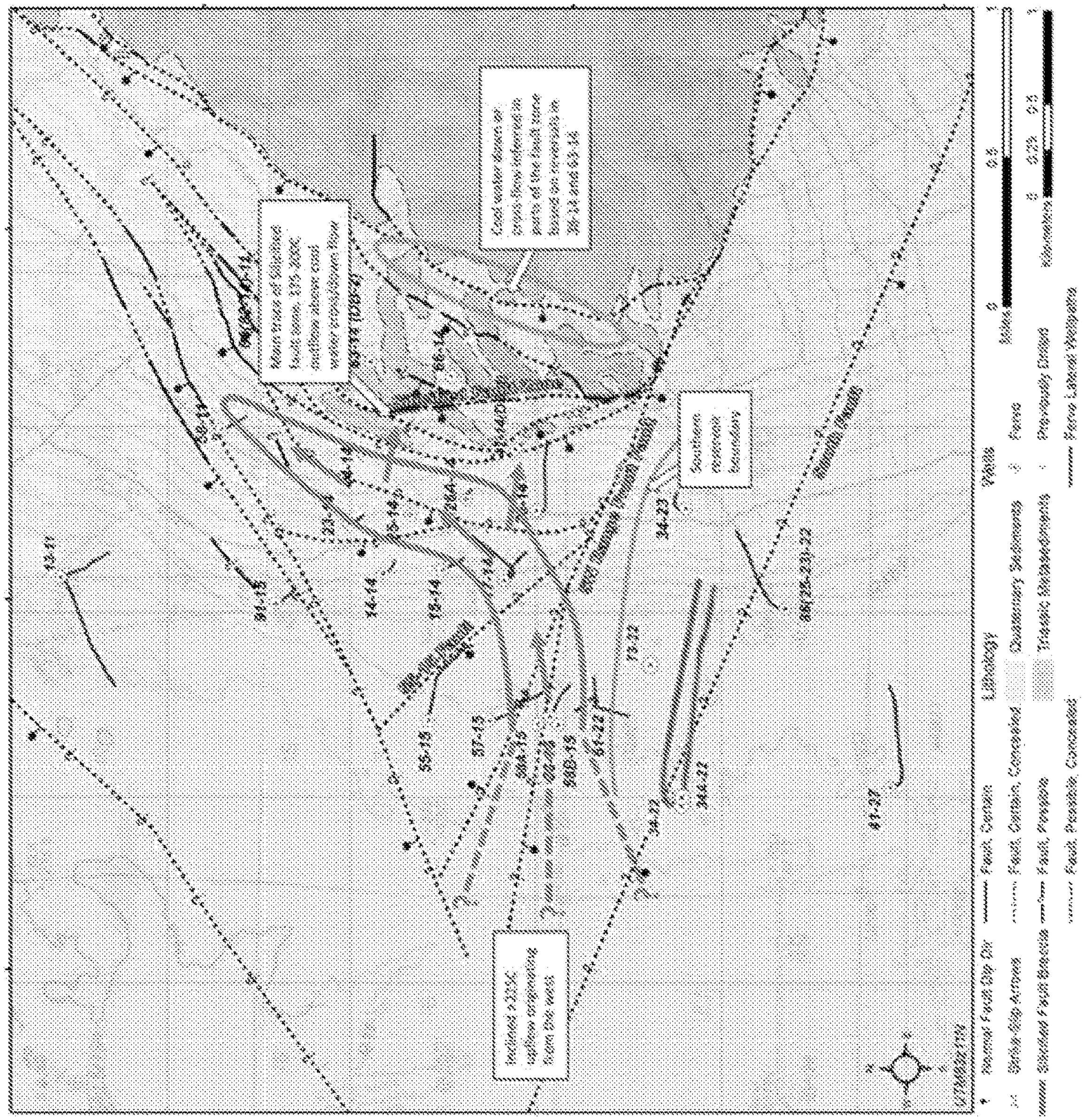
FIG. 5 illustrates a geology and wellfield map showing a conceptual model in accordance with some examples.

FIG. 5 illustrates a geology and wellfield map showing a conceptual model in accordance with some examples. The map includes an approximate southern boundary of the convective geothermal reservoir and the placement of the wells.

In the resulting conceptual model, upflow primarily rises along the NNW-striking Silicified Fault Zone from deep basement formation in the west towards the surface trace of the fault at the eastern edge of the field. At the ground surface, the alteration is relict, and it was not clear based only on the surface expression that this fault zone was going to correlate with inferred fluid flow pathways through the reservoir until the conceptual model was completed. Fluid upflow with temperatures greater than 225° C. (437° F.) rises along the Silicified Fault Zone below and to the west of the 57-15 and 58-15 well pads where wells recorded a maximum measured temperature of 218° C. (424° F.). The high temperature gradients of both wells at total depth suggest greater than 225° C. (437° F.) is likely to be present within a few hundred meters of the bottom of these wells. This upflow temperature is consistent with geothermometry from well DB-1, in which reservoir fluids have chalcedony geothermometer reporting ~220° C. (428° F.) and cation geothermometry reporting approximately 235-250° C. (455-482° F.). The >225+° C. upflow along the Silicified Fault Zone likely has a narrow chimney geometry, given that wells 61-22 and 55-15 are substantially cooler to either side of 58-15 and 57-15 as seen in FIG. 5. Wells 58-15, 57-15, and 61-22 do not intersect the main trace of the Silicified Fault Zone and just miss the main upflow below, but do likely intersect a major synthetic fault in the hanging wall of the main fault. The upflow chimney likely follows a key structural perturbation along the Silicified Fault, such as an intersection with a splay of the SW range-front fault, or a small step in the fault zone. Given the limitations of geophysical modeling and that image logs have not been collected in wells 61-22, 58-15, and 57-15, these possible options for local fault zone complexities cannot be effectively evaluated at this time.

The 200+° C. (392° F.) upflow continues to rise east from below the pads for wells 58-15 and 57-15 where upflow ascends nearly due east toward the well 17-14 area, whereby it turns NE and 175-200° C. (347-392° F.) fluids continue to 58-11. The outflow depth and breadth are best depicted by the flow arrows shown in FIG. 5. Along the upflow path, several hanging walls and maybe one footwall splay may carry some of the fluids as interpreted from well temperature curves. South of the geothermal upflow and outflow zones at Blue Mountain there have been a handful of wells previously drilled (86-22, 41-27, and 34-23) which exhibit relatively conductive temperature conditions and lack deep permeability or connectivity to the rest of the wellfield. This permeability boundary along the south side of the reservoir lies just south of well 61-22 and has been interpreted to be associated with the down-dip projection of the southwest range-front fault as seen in FIG. 1. This recognized lack of deep permeability, reservoir connectivity, and elevated conductive temperatures radiating from the active system to the north makes the southern field (south of southern reservoir boundary line in FIG. 5) relatively compartmentalized, and therefore an ideal testbed for a horizontal well program.

Figure 6:
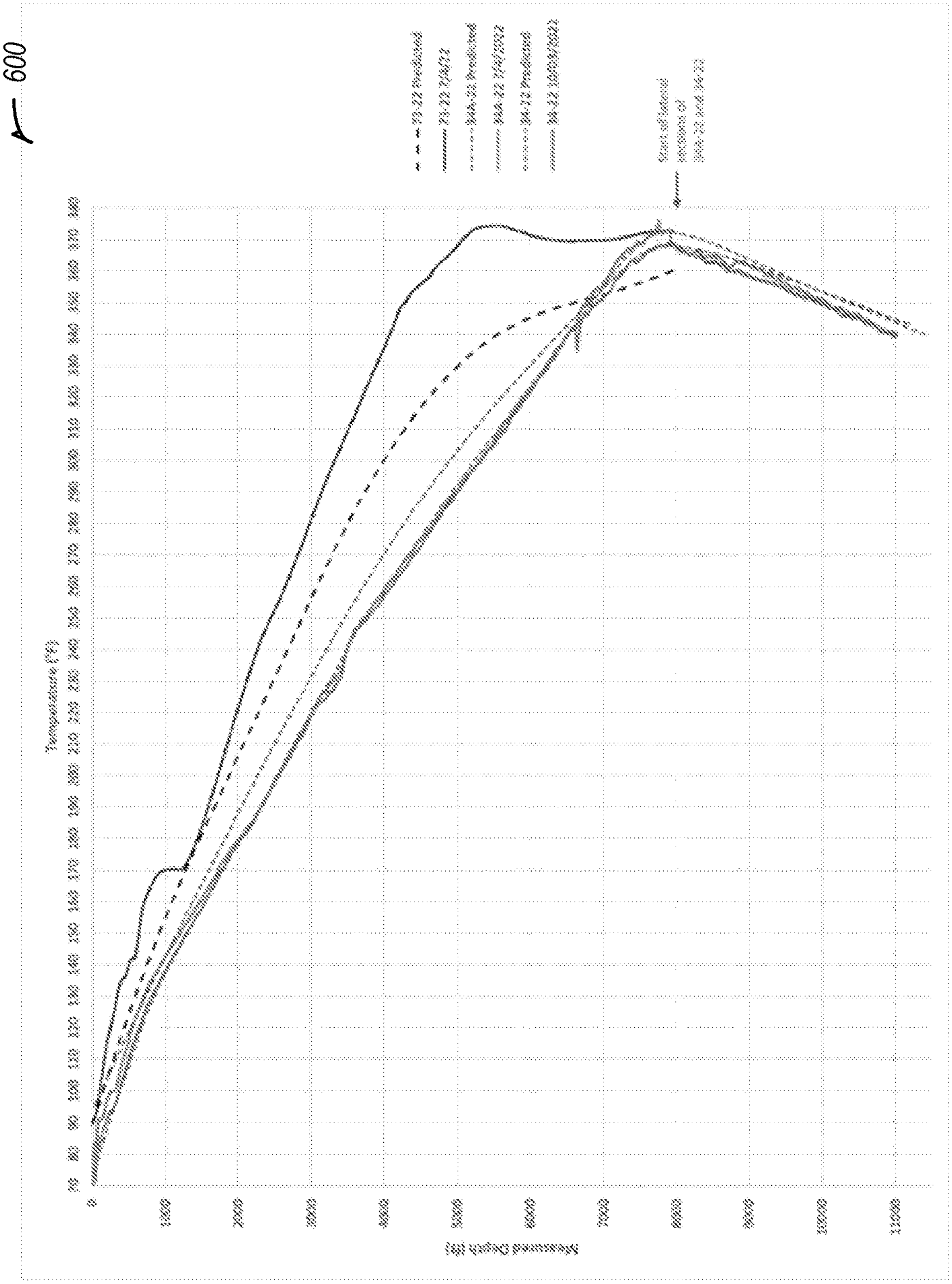
FIG. 6 illustrates pre-drill temperature predictions versus actual measured temperatures for three wells in accordance with some examples.

FIG. 6 illustrates pre-drill temperature predictions versus actual measured temperatures for three wells in accordance with some examples.

An area south of well 61-22 as seen in FIG. 5 was used as an enhanced horizontal well program due to known relatively high temperatures and a lack of deep permeability or reservoir connectivity described in above. Three deep wells were drilled in this southern reservoir area, starting with the vertical observation well 73-22, which was designed to test the depth to Mesozoic basement and temperature model at a position midway through the laterals which were planned to drill. Well 73-22 was also outfitted with permanent distributed acoustic sensing (DAS) and distributed temperature sensing (DTS) fiber to serve as a monitoring station for the future drilling, stimulation, and production of lateral wells. After drilling well 73-22, a horizontal injection well 34A-22 was drilled to a depth of 11,220 ft MD (7,664 ft TVD) and then the horizontal production well 34-22 to a depth of 11,225 ft MD (7,524 TVD). The orientation of the horizontal portions of wells 34A-22 and 34-22 was informed by balancing the known orientation of the stress field to keep the laterals normal to SHmax (maximum horizontal stress) while trying to maintain relatively consistent temperature along the laterals informed by the 3D temperature model. As each well was drilled, the 3D geologic model and temperature models described in this paper were used as a basis for pre-drill prognoses, and then the models were iteratively updated with actual results.

A southern low-permeability/high temperature area was tested by drilling a vertical 73-22 monitoring well at the location shown in FIG. 5. The location for 73-22 was targeted roughly at the horizontal mid-point of the lateral wells (34-22 and 34A-22) which were planned to be drilled following completion of 73-22. In addition to having the purpose of serving as a monitoring well outfitted with acoustic and temperature sensing fiber for a pilot project, 73-22 also had a major de-risking function of further defining the top phyllite basement contact depth, identification of fault hazards, and depth to a temperature target of 350° F.

The predicted temperature curve for 73-22 shown in FIG. 6 was derived by placing the planned well path in the 3D temperature model and projecting temperatures onto the wellbore. After completion of drilling 73-22, a permanent temperature/pressure sensor was installed in the well at 7,920 ft measured depth (MD) and provided a near-equilibrium reading of 368.5° F. The original model for 73-22 predicted a temperature of 360° F. at 7,920 ft MD, which is just 8.5° F. cooler than actual measured temperature. DTS fiber was also installed in 73-22 and provides a full temperature depth profile of the well. After correction of the DTS fiber curve to match the installed 7,920' P/T sensor, the curve shown in FIG. 24 was obtained. The calibrated DTS temperatures were also confirmed later with an equilibrated wireline temperature log. The DTS curve follows the shape of the predicted model but is 7-15° F. warmer than predicted, and more isothermal below a depth of around 5,000 ft MD. The temperature perturbations between 500 ft MD and 1000 ft MD are likely caused by near-wellbore fluid flow through fractures in the silicified sediments where the well had shallow lost circulation. The DTS curve also shows a small rollover or cooling of reservoir temperature of a few degrees F. between 6,000 ft MD and 7,000 ft MD.

The pre-drill geologic model described in Section 2 predicted 73-22 would contact the phyllite basement at a depth of 2,075 ft MD, and error bars were included extending uncertainty from 1,600-2,400 ft MD based on the lack of existing wells for >1,300 ft horizontally in any direction around the well. While drilling 73-22, the phyllite was encountered at a depth of 2,410 ft MD, just at the edge of the deep error bar. To update the geologic model based on this deeper result, it was observed that a well 34-23 to the east and a well 73-22 make a relatively straight line pointing down in the direction of the phyllite bedding dip as observed at surface. Connecting the phyllite contacts between the 34-23 well and the 73-22 well, a dip of 32° to the east is achieved. The previous dip assumption on the contact in this fault block was 29° to the east. This update of dip angle deepened the basement contact prediction for the 34A-22 well to 3,750 ft MD (3,500-4,000 ft error bars). The previous estimate of the contact for 34A-22 using the pr-drilling 3D geologic model was 3,000' (2,600-3,400 ft error bars).

Four potential fault zones were identified in the 73-22 pre-drill prognosis based on the initial 3D model. The faults in the vicinity of 73-22 dip towards south the west, making the 73-22 vertical well location ideal to de-risk the faults for where they would have potentially intersected deeper in lateral wells. Two of the four predicted faults were ranked as low probability as they were thought to terminate north of 73-22. There is evidence that the SW Range Front Fault was encountered in the form of a zone of silicic breccia and calcite mineralization observed from 4,250-4,340 ft MD a short period of 50 bbl/hr starting at 4,330 ft MD which quickly was healed by loss circulate materials (LCM) and cuttings. The two low probability faults were not observed, and neither was the final moderate probability fault (55-15 Fault). It is possible that 55-15 fault has a slightly higher dip angle than was modeled and therefore may still exist below the total depth (TD) of 8,009 ft MD of 73-22 rather than at 7,550 ft MD projected depth based on a shallower dip Silicified sediments are formed when silica enriched geothermal fluids outflow through permeable sands and gravels and deposit an extremely hard matrix surrounding the sand, clay, and gravel grains. They cause slow drilling rate, are abrasive to the bit and drill strings, and most importantly, lead to a total loss of circulation (TLC) of the drilling fluids. TLC was observed in nearly all the offset wells at Blue Mountain while or drilling through silicified sediment zones, and therefore they were identified as a key hazard and indicator of TLC. To prepare for this hazard, a reliable and continuous water supply was set up to drill "blind" when the silicified sediment zone and losses occurred, and a geologic monitoring program to alert key rig personnel when the silicified sediments were observed in cuttings to prepare them for the hazard. Well 73-22 ended up encountering the silicified sediments at a depth of ~550 ft MD and drilled through them to a depth of 992 ft MD where circulation was lost. The well was successfully drilled blind with reserve water supply until returns were regained temporarily from 1,006 to 1,073 ft MD likely due to a plugging off the loss zone with cuttings, before another fracture within the silicified sediments accompanied by a large drilling break encountered at 1,073 ft MD led to total loss of circulation again. Two cement plugs were spotted to try to cure losses in this zone, but TLC persisted until returns were slowly regained to 100% at a depth of 1,545 ft MD. The regaining of circulation may have been contributed to by a combination of the cement and packing off the fracture with hundreds of feet of cuttings.

The predicted temperature profile for 34A-22 was projected to the planned well path from the 3D temperature model updated with the results of a 73-22 monitoring well as seen in FIG. 6. In 34A-22, 7-in completion casing was cemented from TD to surface with DTS fiber on June 2nd, and DTS monitoring has been ongoing since. The latest DTS temperature profile for the well was recorded on Jul. 4, 2022 and shows a very similar shape to what was predicted in the pre-drill prognosis, with a perfect match to predicted 368° F. at the heel (8000 ft MD) and 340° F. at the toe (11,000 ft MD) where 348° F. was predicted. The DTS fiber values were also verified on Jul. 4, 2022 with a calibrated wireline temperature survey and show a close match in profile to the fiber as seen in FIG. 6. The profile shows conductive temperature conditions as expected, with the exception of a 7° F. reversal from 6620 to 6690 ft MD which correlates with a mud loss zone encountered in the well where 43 bbls total were lost from 6630 to 6640 ft MD.

The phyllite basement contact prediction for 34A-22 was 3,750 ft MD with an error range of 3,500-4,000 ft MD, based on the updated model following completion of 73-22. Upon drilling 34A-22, the phyllite basement contact was observed at 3500 ft MD, or the shallow edge of the predicted error bars. Interestingly, that indicates a dip for the basement contact of 29° between 34A-22 and 34-23, which was the originally modeled dip assumption before drilling 73-22. The reality is that there is likely variation/undulation of the contact dip within the fault block, which is why 5° of variation was assumed on the predicted depth range and underscores the value of having error bars on the contact predictions. This natural undulation in the overall contact dip was incorporated into the 3D model with ties to the well observations.

Three faults were predicted in 34A-22, at 670 ft MD (South Fault), 6,140 ft MD (SW Range Front), and 11,250 ft MD (55-15 fault). Indications of the South Fault were not observed, which could be due to its position within unconsolidated sediments where it was predicted to intersect the well. Faults are often only expressed as open fractures where they have hard formation to keep them open, and this fault may only be expressed deeper where it intersects and offsets the phyllite basement or more indurated sediments. The SW Range Front was also not observed within the predicted depth range; however, it was classified as low probability based on observations in 73-22 where only minor clay and calcite indicators were seen without significant mud losses. A small 43 bbl mud loss was encountered in 34A-22 from 6630 to 6640 ft MD, which may have been caused by the SW Range Front fault with a slightly steeper dip than modeled. This loss zone only lasted for 10 ft of drilling before it was sealed off by 2-5 mm cuttings, indicating that it was likely expressed as a small aperture (<5 mm) fracture in the wellbore. This loss zone could alternatively be unrelated to the SW Range Front fault, and instead been related to stratigraphic permeability within the formation or foliations. Finally, the 55-15 fault was not observed, however the total depth of 34A-22 (11,220 ft MD) did not reach the full predicted depth range of that fault (11,250+/−150 ft MD).

Figure 7:
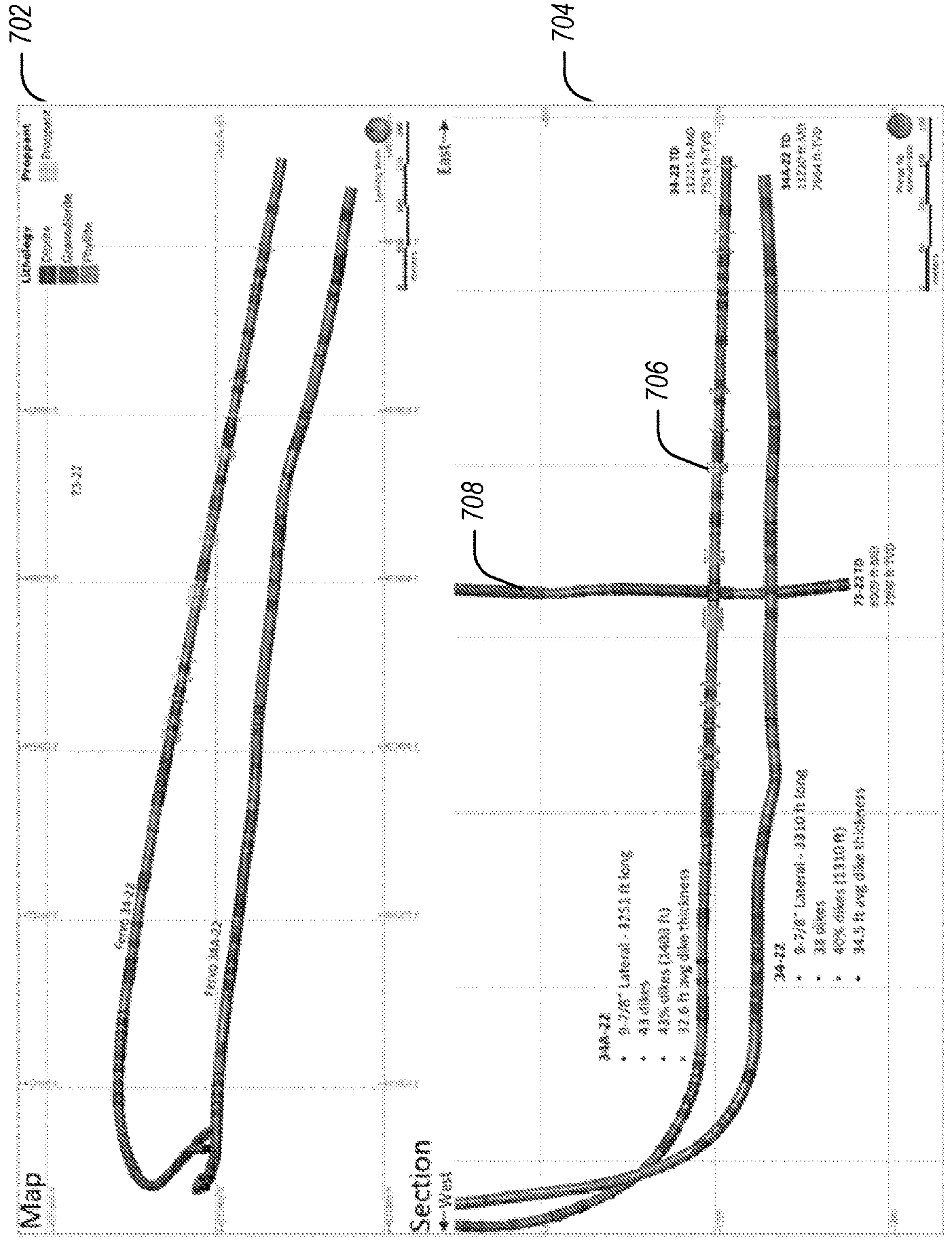
FIG. 7 illustrates lithologies proppant detections plotted along the wellpaths for three wells in accordance with some examples.

FIG. 7 illustrates lithologies proppant detections plotted along the wellpaths for three wells in accordance with some examples.

The temperature profile for 34-22 was expected to be nearly identical to 34A-22 in the vertical portions of the wells, since they are both located on the same pad ~150 ft apart. In the lateral portions, based on the updated 3D temperature model using the results from 73-22 and 34A-22, 34-22 was expected to be ~5° F. warmer on average than 34A-22 due to 34-22 being 200-300 ft further north, which places the well closer to the convective geothermal system and source of hot deeply circulating fluids for the system. This translates to a prediction of 372° F. at the heel (8000 ft MD) and 343° F. at the toe (11,225 ft MD) for 34-22. DTS fiber temperatures in 34-22 indeed showed a profile identical to 34A-22 in the vertical section and warmer by a few degrees in the lateral. Although the temperature of 34-22 has not been recorded at ~5° F. higher than in 34A-22, as predicted, at the time of the latest fiber reading the well was still heating up and not fully equilibrated as seen in FIG. 6. Significant de-risking of faults for 34-22 occurred with the drilling of 34A-22 just 150 ft to the east. Potential fault candidates (such as the South Fault) were eliminated as hazards based on the drilling of that well which did not see the structure, likely be due to its position within unconsolidated sediments. Two minor faults were still predicted in 34-22 at 6400 ft MD+/−100 ft MD (SW Range Front), and 11,000 ft MD+/−200 ft MD (55-15 fault). The SW-Range-Front fault caused a small 43 bbl mud loss in the previous 34A-22 well that lasted for 10 ft of drilling before it was sealed off by 2-5 mm cuttings, indicating that it was likely expressed as a small aperture (<5 mm) fracture in the wellbore. Where it was expected in 34-22, a smaller loss of 10 bbl/hr was encountered at 6,365 ft MD, which was above the background of 3-5 bbl/hr. This increase in losses in 34-22 was small but insignificant as a hazard; however, it could be indicative of the presence of a minor natural fracture. The 55-15 fault was not observed in either 34A-22 or 34-22; however, both wells were completed to a total depth shorter than the total depth range within that the fault was predicted to occur.

During a stimulation of 34A-22, a distinctive 100 mesh size proppant sand was injected into 34A-22 and the fracture network created during stimulation. The 100 mesh proppant was composed of sub-rounded pure quartz sand grains with the strict 100 mesh filter size and a bright yellow-orange oxidized coloration. No mineralogies match these characteristics in the natural formation, and no quartz sands matching the proppant were observed in the prior wells. Since well 34-22 was drilled after the stimulation and proppant injection into 34A-22, close attention was paid to the 34-22 cuttings while drilling to detect the proppant, with hand samples of un-injected proppant sitting beside the cuttings microscope for direct comparison. 12 zones of proppant were indeed detected in the 34-22 cuttings (larger marked zones in FIG. 7, such as 706), proving evidence that the stimulated fracture network reached across the field between the two well laterals. In most of these cases, the detections included 2-3 grains in a single 10-ft cuttings sample interval. Because proppant concentrations are observed to be quite low at this distance from 34A-22, the absence of detections in other intervals of the well are not thought to be evidence of the absence of proppant or stimulated fractures in those areas.

Before the drilling of the wells at Blue Mountain, the prevalence of intrusive diorite and granodiorite dikes/sills across all wells at Blue Mountain was analyzed and 17,785 ft of diking was found within 93,436 ft of Mesozoic basement formation, providing an apparent dike thickness ratio of 19% as percent of basement. Another observation made across this dataset was that the diorite and granodiorite dikes/sills are almost never found in the shallowest 3000 ft of phyllite below the contact with sediments. As wells were drilled for 73-22, 34A-22, and 34-22 wells, that trend held and dikes/sills were not observed until at least 3000 ft below the contact. In 73-22, 1659 ft of dikes/sills were observed in the basement that was drilled from 2,430-8,009 ft MD, resulting in a dike ratio of 30%. Only looking at the 8¾ in section of the well from 5,009-8,009 ft MD which in reality is the only portion of the basement where the dikes exist, a dike ratio of 55% is obtained. In 34A-22 1,723 ft of dikes were observed in the basement that was drilled from 3,500-11,220 ft, resulting in a dike ratio of 22%. Considering only the 9⅞ in section from 7,969-11,220 ft MD where the dikes predominantly exist, a dike/phyllite ratio of 43% is obtained. The prevalence of dikes in 34-22 was very slightly lower than in 34A-22, with 1,310 ft of dikes within the 9⅞ in section of 34-22 providing a dike/phyllite ratio of 40% (smaller indicated zones in FIG. 7, such as 708). Average dike thickness in all wells across the field except the test wells was 115 ft, whereas average thickness in 34A-22 was 32.6 ft and in 34-22 the average thickness was 34.5 ft. Diorite and granodiorite dikes mapped at the surface of Blue Mountain and to the south at the Eugene Mountains are expressed mostly as low-angle bedding-parallel sills exploiting bedding weaknesses in the phyllite. Image log data from 34-22 also suggest contacts between the intrusives and metamorphic basement are oriented north to northeast and dip west, parallel to bedding.

Figure 8:
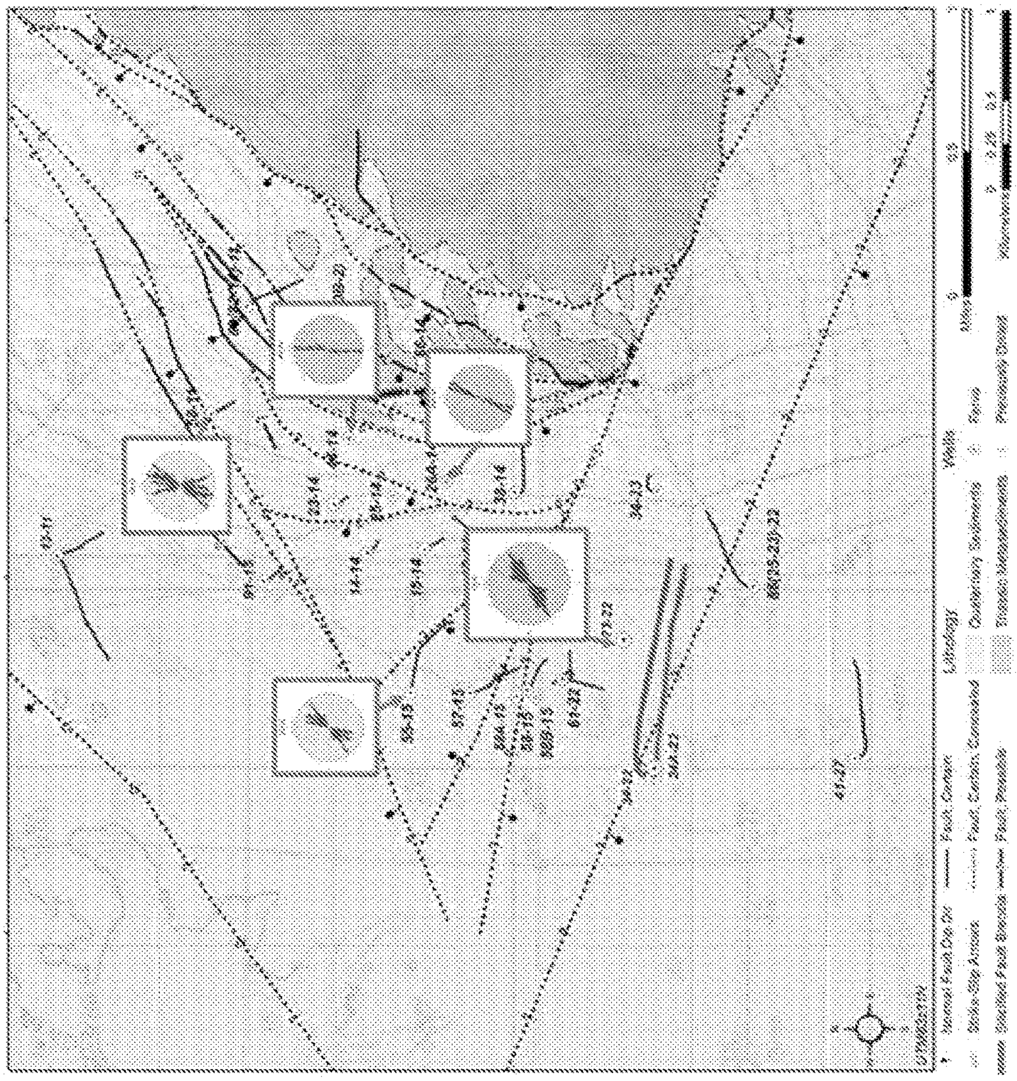
FIG. 8 illustrates a map and rose diagram showing the locations and orientations of drilling-induced fractures at Blue Mountain in accordance with some examples.

FIG. 8 illustrates a map and rose diagram showing the locations and orientations of drilling-induced fractures at Blue Mountain in accordance with some examples. In an example, a well (73-22) DIFs are shown trending NE at the south end of the field.

Prior to drilling, there were four existing wells with image log data at Blue Mountain, which were reviewed. All the logs were collected in the phyllite basement formation. From NE to SW, a report found that drilling-induced fractures (DIFs) at Blue Mountain have an average azimuth of 10.3° in 58-11, 009.5° in 44-14, 021.4° in 26A-14, and 037.6° in 55-15 as seen in FIG. 8. Stress inversion calculations from fault surface measurements collected in 2020 indicate SHmax oriented 019° and within the range of the well data. The trend of distribution of DIFs in these wells showed a steady progression of clockwise rotation of SHmax along a NE-SW trend, starting from 58-11 and extending through 55-15. The apparent rotation may be due to local variations in stress occurring in the accommodation zone between the NW- and NE-striking faults at Blue Mountain. Stress rotations have been documented in relay ramps in step-overs associated with extensional fault regimes globally. Earthquakes induce temporal changes in magnitude and orientation of the stress field. Localized vertical axis stress rotation has recently been interpreted for the upflow of the Star Peak geothermal resource. In some examples, a largest gap in stress field data may include no image log data for wells on the south side of the reservoir. It is in this area in which there could be a further rotation of the stress field.

Figure 9:
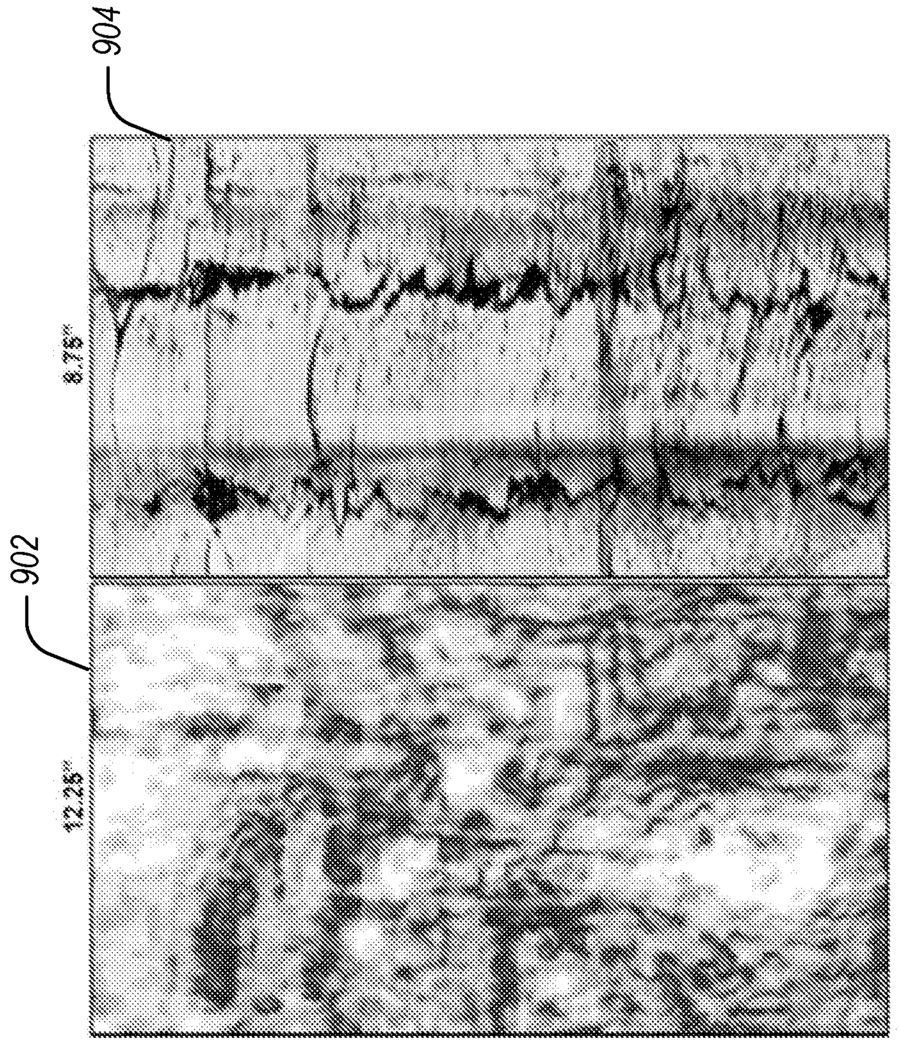
FIG. 9 illustrates example sections of an acoustic image log in accordance with some examples.

FIG. 9 illustrates example sections of an acoustic image log in accordance with some examples. The example sections of the acoustic image logs in FIG. 9 may be collected in a well in a 12¼ in-hole section 902 and a 8¾ in-hole section 904. Well-developed DIFs can be seen in the example from the 8¾ in-hole section 904.

Image logs were collected in two portions of 73-22, the 12¼ in hole section from 2,615-5,002 ft MD and the 8¾ in hole section from 4,952-7,988 ft MD. Log quality in the 12¼ in section was low, and DIFs were either not observable or not present in that portion of the well. In the 8¾ in hole section, however, there were over 900 well-developed DIFs observed though nearly the entire interval as seen in FIG. 9. The DIFs in 73-22 were clustered with an average orientation and resulting SHmax orientation of 59.5° northeast. This shows a continued trend of clockwise rotation to the SW, although to a larger degree than was expected. As 73-22 is located approximately at the midpoint of planned lateral wells, this SHmax orientation may be used to determine the optimal orientation of the lateral sections of those wells. Further variation of the stress field may occur along these future lateral wells at both the heel and the toe, but it may still be within reasonable range of this SHmax orientation. Borehole breakouts, which typically occur 90° from the SHmax orientation and represent the orientation of SHmin, were only observed in a small interval from 7,510-7,574 ft MD and had an average azimuth orientation of 160° (southeast). Bedding/banding of the phyllite was observed to predominantly dip to the NW with a 300° average dip azimuth with a smaller significant population dipping to the SW with a 255° average dip azimuth. Natural fractures tightly cluster and dip NW with an average azimuth of 300°.

A resistivity image log was also successfully collected in the horizontal sections of the 34-22 well. In summary, features interpreted from the image log can be generally split into three groups: (1) natural features that dominantly strike north to northeast and are most likely associated with the rock fabric, (2) natural features that dominantly strike northwest to north-northwest and are most likely associated with fault zones, and (3) drilling induced damage generated by the hoop stresses at the borehole wall. The group of features associated with rock fabric are a mix of picked features and observations of image texture. In summary, these data indicate that the contacts between the intrusive dikes and metamorphic basement are likely to be oriented north to northeast and dip west. The 34-22 image yielded an unusually high number of electrically conductive features. Many of those classified as low-confidence electrically conductive are likely the rock fabric rather than fractures. However, the moderate to low quality of the image prevented confident classification of these features as bedding. Features characterized as "Composite" are electrically conductive features with indications of multiple interacting fractures, often with fragments missing from borehole wall. Composite features are in many instances likely to be a feature of the rock fabric rather than recent fracturing. In some cases, these composite features correlate with lithology changes interpreted from the gamma, even when there is no textural change visible in the image. Composite features are also found in conjunction with confidently identified internal bedding, perhaps indicating shearing. Features confidently identified as internal bedding strike north to northeast and dip west. While composite features have higher orientation uncertainty than other feature types because they do not fit a single sinusoid, most have orientations that resemble the confidently identified internal bedding.

Drilling induced damage in 34-22 includes axial and en echelon tensile fractures and borehole breakout. These features on the borehole wall are a consequence of hoop stresses. Overall, axial tensile fractures and the center-point of en echelon tensile fractures formed 150-160° from the high-side of the borehole (i.e., just before the lowest point), with some rotations that likely relate to fault zones. Tensile fractures at the high side are not resolved in the micro-resistivity image because of poor pad contact with the borehole wall. The acoustic image also does not resolve the high-side tensile fractures, likely because the tool was not central in the well. Borehole breakout formed on either side of the 34-22 borehole at a wide range or orientations, consistent with a horizontal well drilled in a normal faulting setting.

Exploratory forward model scenarios were used to determine the distribution of DI Damage on an inclined borehole and may be constructed using a system of equations. This method projects the tectonic stress tensor (orientation and magnitude) onto the borehole wall to calculate the hoop stresses and, subsequently, the characteristics of the resulting DI Damage. These results indicate that the stress field determined from data in 34-22 may be characterized by SHmax of ~020° and the stress conditions may be transitional to strike-slip. This is consistent with stress modeling of fault surface data, which indicated SHmax azimuth of 019° (NNW) and a Mohr's circle stress ratio R value calculation of 0.71 which indicates a transtensional regime.

Figure 10:
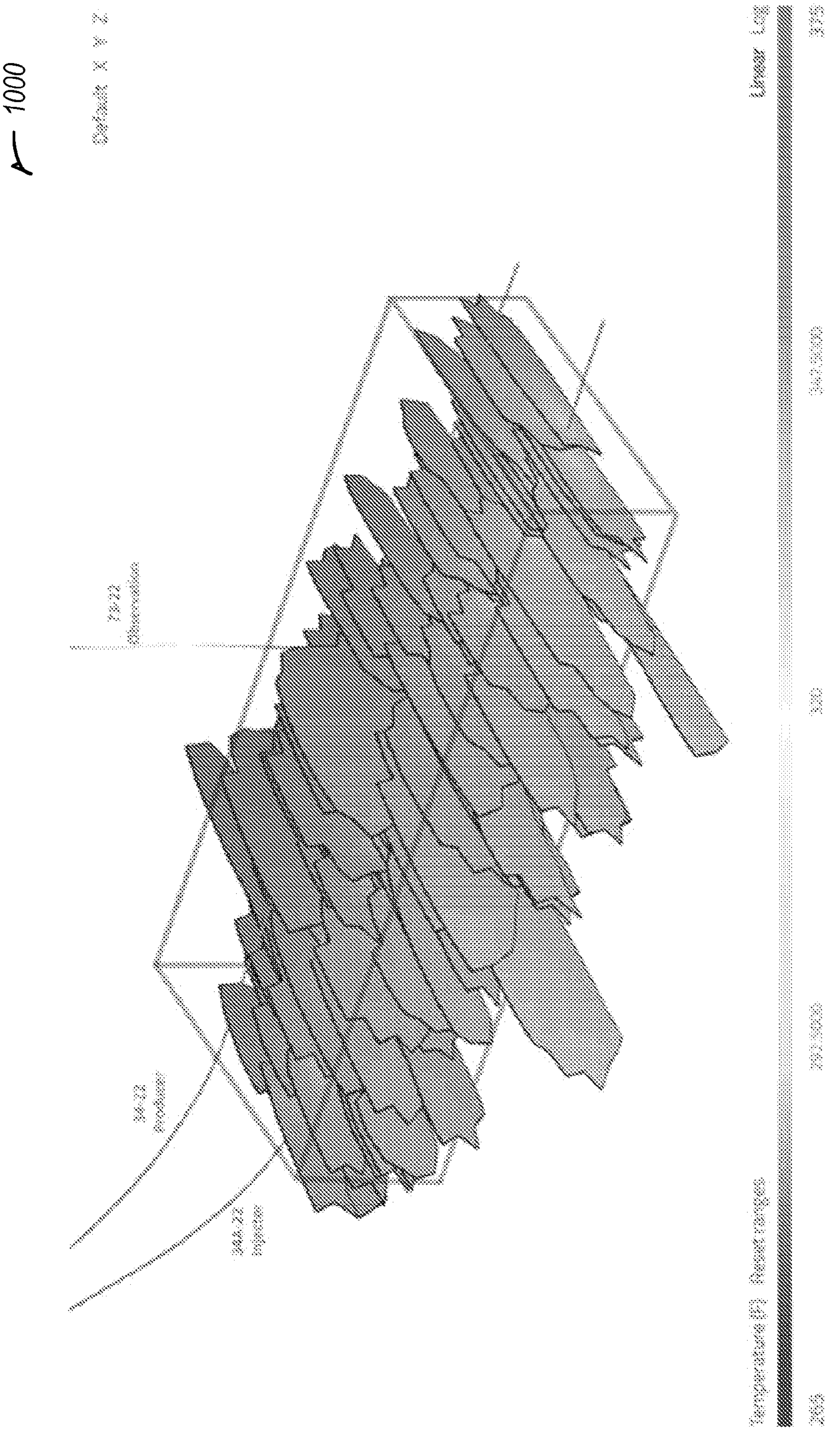
FIG. 10 illustrates heat-in place model results in accordance with some examples.

FIG. 10 illustrates heat-in place model results in accordance with some examples. FIG. 10 shows extents of a heat-in place model within a stimulated fracture geometry for an example injection well 34A-22 based on stimulation history matching.

As a first step in characterizing the resource potential of a horizontal well geothermal development strategy, a heat-in-place analysis for a doublet horizontal well system at Blue Mountain may be performed. This is a useful method that can be used to set bounds on the power capacity of the system prior to production testing. The results of the heat-in-place analysis can be used to evaluate the viability of the project.

Heat in place can be calculated with the following equation:

$$H_{tot} = \int \rho c(T - T_0)dV, \quad \text{(Eq. 1)}$$

where $H_{tot}$ is the total thermal energy originally in place, ρ is the reservoir rock density, c is the reservoir rock heat capacity, T is the reservoir rock temperature, $T_0$ is a reference temperature (taken as the geothermal brine temperature at the outlet of the power plant heat exchanger), and V is the reservoir volume. The thermal energy actually recoverable is controlled by the thermal recovery factor, which can depend on the well pattern, the stimulation efficiency, the geometry of the stimulated reservoir volume, the thermal diffusivity of the rock, the reservoir management strategy, and other geologic and operational factors. The recoverable heat in place is then:

$$H_{recov} = r\int \rho c(T - T_0)dV, \quad \text{(Eq. 2)}$$

where r is the thermal recovery factor. For the scenario of geothermal electric power production considered here, the electrical energy that can be generated from the resource can then be calculated as:

$$E = \eta r\int \rho c(T - T_0)dV, \quad \text{(Eq. 3)}$$

where η is the thermal-to-electric conversion efficiency of the binary power plant facility. The power capacity of the system (averaged over the lifetime of the facility) may be calculated as:

$$P = \frac{E}{\Delta t}, \quad \text{(Eq. 4)}$$

where Δt is the lifetime of the facility.

The heat-in-place for the project area at Blue Mountain was calculated using a three-dimensional geologic model and temperature distribution, where the subsurface was discretized into a Cartesian mesh with uniform grid block size. Grid block volumes of 10×10×10 m were selected for the models, giving each block a volume of 1000 $m^3$. Values for heat capacity were populated assuming the average heat capacities of phyllite and of diorite. Values for density of the phyllite and diorite dikes were obtained from an analysis of the 73-22 quad combo logs. The proportion of phyllite to diorite by length in well 34A-22 was 57% and in well 34-22 was 60%, therefore an average proportion of phyllite to diorite of 58.5% was assumed for the bulk volume of rock between and immediately surrounding the wells. Applying these proportions to the heat capacity and density values derived for the phyllite and diorite, an effective density of 2,782 $kg/m^3$ and a heat capacity of 0.77 kJ/kg/° C. for the bulk intruded phyllite formation may be obtained, as shown in Table 1, below. The reference temperature was taken as 75° C. based on the average reinjection fluid temperature for the Blue Mountain wellfield.

TABLE 1

Heat capacity and density values calculated for heat-in-place models.

| Rock Type | Heat Capacity (kJ/kg/K) | Density (kg/m$^3$) | Source |
|---|---|---|---|
| Phyllite | 0.76 | 2720 | 73-22 Quad Combo Log; Waples and Waples (2004) |
| Diorite | 0.79 | 2870 | 73-22 Quad Combo Log; Waples and Waples (2004) |
| Intruded Phyllite (59% Phyllite / 41% Diorite) | 0.77 | 2782 | Weighted average based on proportional lithologies observed along the laterals |

The heat-in place model created for this study covers the extent of stimulated reservoir volume created by a multi-stage stimulation of well 34A-22 and has dimensions of 1030 m×540 m×240 m as seen in FIG. 10. Injection Well 34A-22 was stimulated with a 16-stage plug-and-perf hydraulic stimulation treatment with proppant, in which a total of approximately 267,000 bbl (11.2 million gal) of fluid and 7.3 million lbs of sand proppant were pumped. The stimulated reservoir volume geometry was characterized using several independent reservoir diagnostics approaches, including microseismic monitoring, fiber optic strain sensing, pressure transient analysis, and offset well pressure monitoring (Norbeck et al., 2023). Several points of evidence lead to these fracture extents, including the extent of microseismic events and strain data deriving fracture half-length and half-height from DAS fiber installed in 34A-22, 34-22, and 73-22.

The heat-in-place model for a stimulated reservoir volume computes a total thermal energy originally in place (H_tot) of 3.04×1013 kJ using the above inputs. Based on analog geothermal systems, thermal recovery factors can range from about 20% to 50%. Computational reservoir modeling may be determined to find a similar range of recovery factors depending on well spacing, stimulation treatment design, and geologic factors. Therefore, for this analysis it may be assumed that a thermal recovery factor (r) of 35% occurred. The thermal-to-electric conversion efficiency (η) may be assumed to be 15% based on the observed plant efficiency. In some examples, geothermal power facilities are designed for a useful life of 15 to 30 years, however, given the infill and repower nature of this project, the system was designed for a useful project life (Δt) of 10 years.

Under these assumptions, it may be determined that the effective average power capacity of the horizontal well doublet system is to be 5.1 MW. This is consistent with the power output of a geothermal well producing at approximately 80 kg/s at a temperature of 350-375° F. (the target well performance of the example system), given the power conversion efficiency of the Blue Mountain facility. Therefore, it can conclude that the stimulated reservoir volume created during the 34A-22 treatment is sufficiently large to meet the reservoir performance requirements for this project.

For this heat-in-place analysis, the SRV from the stimulation treatment on one well (Injection Well 34A-22) may be used. Prior to production testing, Production Well 34-22 may be stimulated, for example adding significant reservoir volume and fracture surface area. In addition, due to the first-of-a-kind nature of this horizontal drilling program, the productive lateral length of each well may be limited to about 1000 m. In future projects, longer laterals may be drilled, which can increase the reservoir volume. In addition, through additional field trials focused on completion design optimization, the thermal recovery factors for these systems may be improved. Therefore, 5 MW per production well may be a lower bound for this type of well design and reservoir management strategy.

In some examples, results from a nearfield enhanced geothermal system project targeting a low permeability reservoir compartment adjacent to the Blue Mountain hydrothermal system at a depth of 2.1 to 2.5 km may be provided. Three deep wells were successfully drilled at Blue Mountain, including the first two known high-temperature geothermal horizonal wells drilled metamorphic and igneous lithologies. In some examples, a reservoir conceptual model may be developed using offset well data, geologic mapping, and geophysical surveys to design the drilling program and inform the stimulation treatment design. The as-drilled lithology and measured equilibrated temperatures matched the model predictions closely, confirming the value of developing this style of project in a nearfield hydrothermal setting. Drilling induced fractures from image logs and stress modeling indicate an SHmax aligned to the NNE and informed the optimal orientation for the lateral trajectories of the horizontal wells 34A-22 and 34-22. A well 34A-22 was impermeable prior to stimulation and had proppant injected during stimulation which was detected 300-400 ft away while drilling the lateral portion of 34-22, providing direct geologic evidence of the successful creation of a new hydraulicly stimulated fracture network. Heat-in-place estimates confirm that the stimulated reservoir volume created from the stimulation treatment in well 34A-22 was sufficiently large to enable approximately 5 MW of electric power production over a 10-year project life, consistent with the target well performance for this project.

The successful completion of this project indicates that no technical barriers exist to developing horizontal drilling and completions programs in high-temperature and hard rock settings. The reservoir performance results described for this first-of-a-kind project demonstrate that nearfield EGS projects can be developed economically today and show a clear pathway toward further improvements in project economics with reasonable advances in drilling performance, stimulation treatment effectiveness, and reservoir management strategies.

Figure 11:
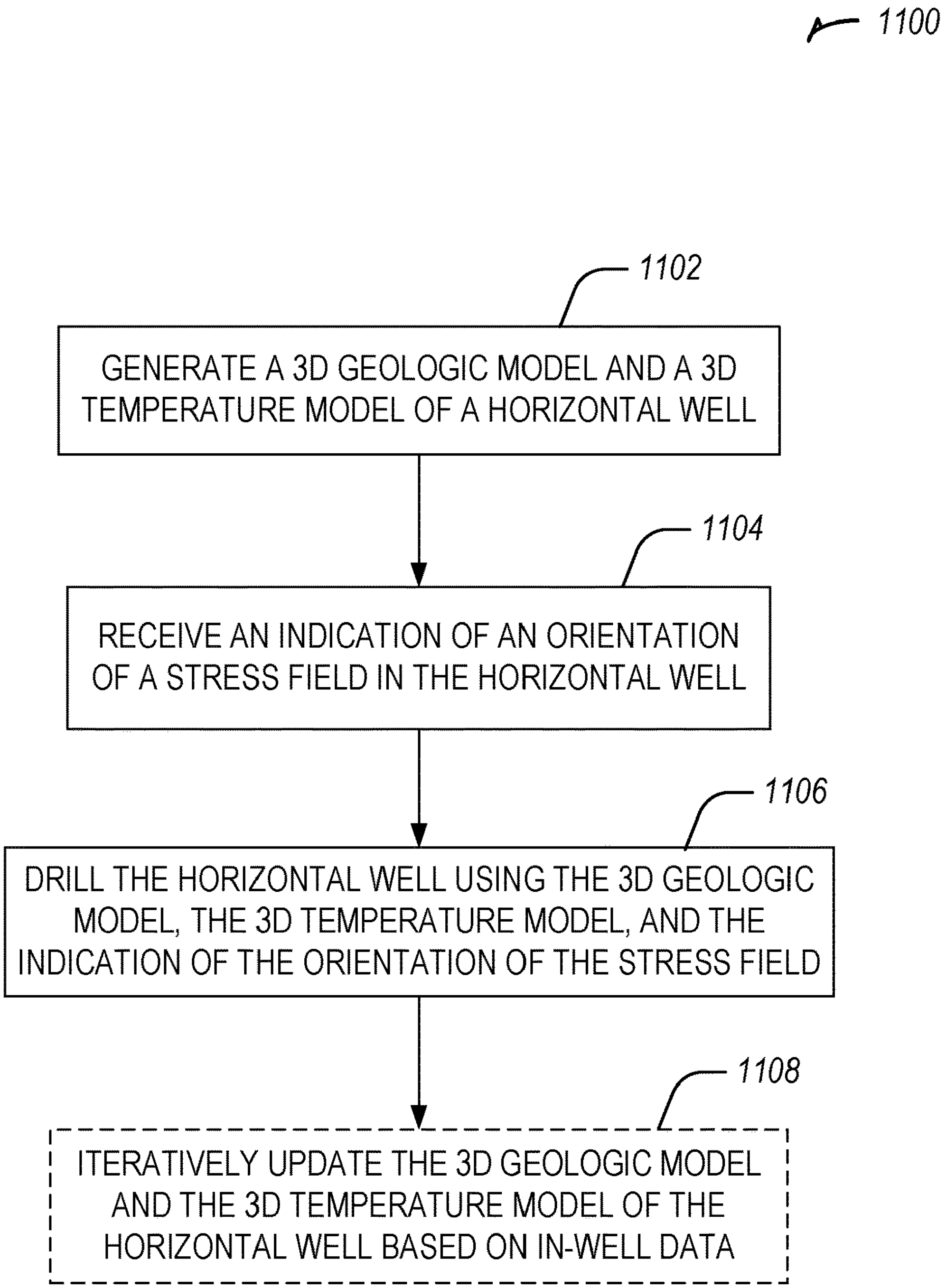
FIG. 11 illustrates a flowchart showing a technique for identifying geology, state of stress, or heat in place for a horizontal well in accordance with some examples.

FIG. 11 illustrates a flowchart showing a technique 1100 for identifying geology, state of stress, or heat in place for a horizontal well.

The technique 1100 includes an operation 1102 to generate a 3D geologic model and a 3D temperature model of a horizontal well.

The technique 1100 includes an operation 1104 to receive an indication of an orientation of a stress field in the horizontal well. In an example, the indication of the orientation of the stress field includes a maximum horizontal stress orientation. In some examples, the maximum horizontal stress orientation is used to determine an optimal orientation of a lateral section of the horizontal well.

The technique 1100 includes an operation 1106 to drill the horizontal well using the 3D geologic model, the 3D temperature model, and the indication of the orientation of the stress field. Operation 1106 may include optimizing between maintaining laterals normal to a maximum horizontal stress using the indication of the orientation of the stress field and maintaining consistent temperature along the laterals using by the 3D temperature model.

The technique 1100 includes an optional operation 1108 to iteratively update the 3D geologic model and the 3D temperature model of the horizontal well based on in-well data. The in-well data may include distributed acoustic sensing (DAS) or distributed temperature sensing (DTS) fiber data.

The technique 1100 may include generating an acoustic image log or a resistivity image log of the horizontal well. In this example, the technique 110 may further include identifying one or more tensile fractures created during stimulation treatment using the acoustic image log or the resistivity image log of the horizontal well.

Figure 12:
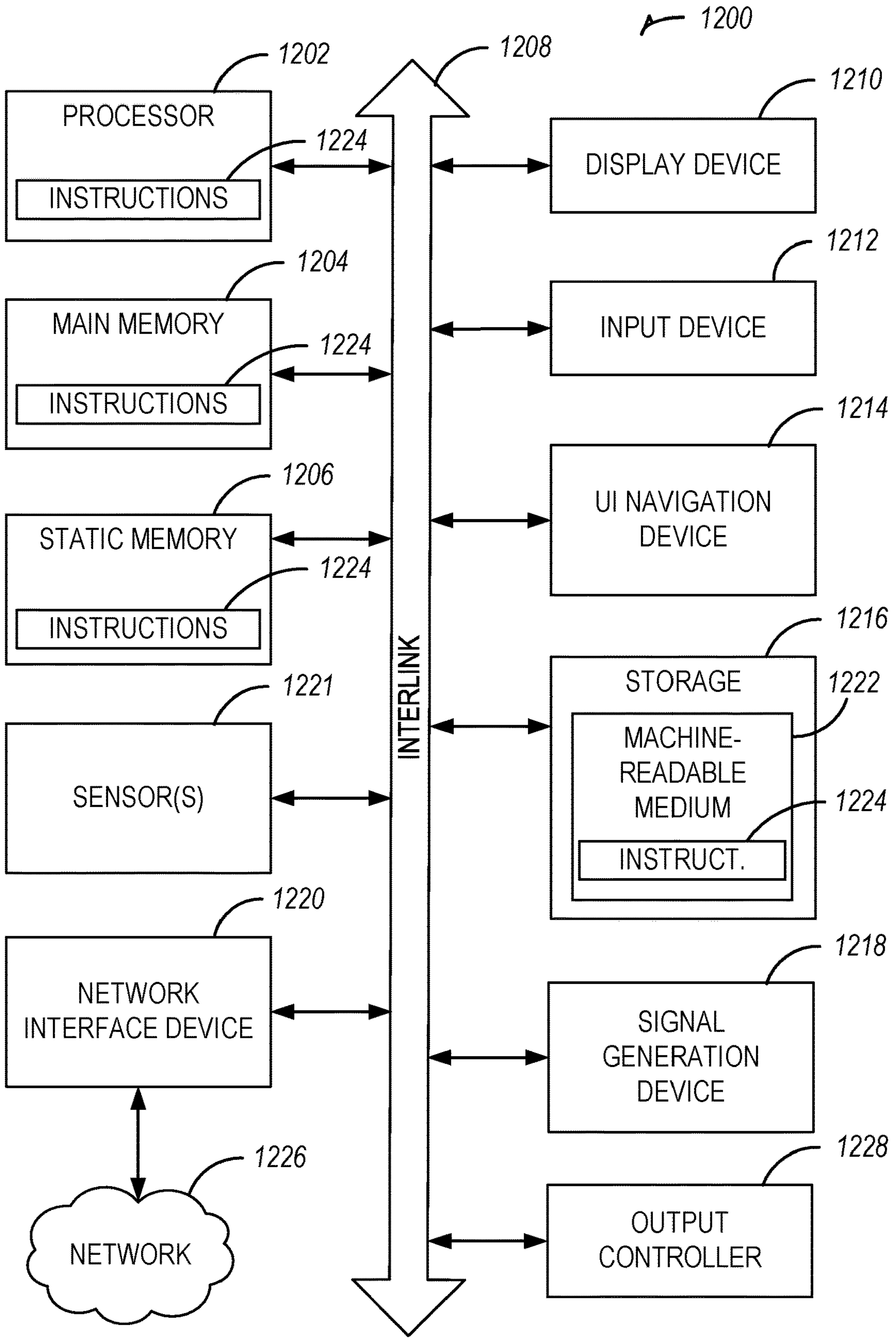
FIG. 12 illustrates generally an example of a block diagram of a machine upon which any one or more of the techniques discussed herein may perform in accordance with some examples.

FIG. 12 illustrates generally an example of a block diagram of a machine 1200 upon which any one or more of the techniques (e.g., methodologies) discussed herein may perform in accordance with some examples. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term “machine” shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, alphanumeric input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 that is non-transitory on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

In view of the disclosure above, various examples are set forth below. It should be noted that one or more features of an example, taken in isolation or combination, should be considered within the disclosure of this application.

Example 1 is a method comprising: generating a 3D geologic model and a 3D temperature model of a horizontal well; receiving an indication of an orientation of a stress field in the horizontal well; drilling the horizontal well using the 3D geologic model, the 3D temperature model, and the indication of the orientation of the stress field; and iteratively updating the 3D geologic model and the 3D temperature model of the horizontal well based on in-well data.

In Example 2, the subject matter of Example 1 includes, wherein the in-well data includes distributed acoustic sensing (DAS) or distributed temperature sensing (DTS) fiber data.

In Example 3, the subject matter of Examples 1-2 includes, wherein the indication of the orientation of the stress field includes a maximum horizontal stress orientation.

In Example 4, the subject matter of Example 3 includes, using the maximum horizontal stress orientation to determine an optimal orientation of a lateral section of the horizontal well.

In Example 5, the subject matter of Examples 1~4 includes, generating an acoustic image log or a resistivity image log of the horizontal well.

In Example 6, the subject matter of Example 5 includes, identifying one or more tensile fractures created during stimulation treatment using the acoustic image log or the resistivity image log of the horizontal well.

In Example 7, the subject matter of Examples 1-6 includes, D temperature model.

Example 8 is at least one machine-readable medium including instructions, which when executed by processing circuitry, cause the processing circuitry to perform operations including: generating a 3D geologic model and a 3D temperature model of a horizontal well; receiving an indication of an orientation of a stress field in the horizontal well; drilling the horizontal well using the 3D geologic model, the 3D temperature model, and the indication of the orientation of the stress field; and iteratively updating the 3D geologic model and the 3D temperature model of the horizontal well based on in-well data.

In Example 9, the subject matter of Example 8 includes, wherein the in-well data includes distributed acoustic sensing (DAS) or distributed temperature sensing (DTS) fiber data.

In Example 10, the subject matter of Examples 8-9 includes, wherein the indication of the orientation of the stress field includes a maximum horizontal stress orientation.

In Example 11, the subject matter of Example 10 includes, wherein the operations further comprise using the maximum horizontal stress orientation to determine an optimal orientation of a lateral section of the horizontal well.

In Example 12, the subject matter of Examples 8-11 includes, wherein the operations further comprise generating an acoustic image log or a resistivity image log of the horizontal well.

In Example 13, the subject matter of Example 12 includes, wherein the operations further comprise identifying one or more tensile fractures created during stimulation treatment using the acoustic image log or the resistivity image log of the horizontal well.

In Example 14, the subject matter of Examples 8-13 includes, D temperature model.

Example 15 is a method comprising: receiving a 3D geologic model and a 3D temperature model of a horizontal well; receiving an indication of an orientation of a stress field in the horizontal well; identifying a drill plan for the horizontal well using the 3D geologic model, the 3D temperature model, and the indication of the orientation of the stress field; and iteratively updating the 3D geologic model and the 3D temperature model of the horizontal well based on simulation data using the drill plan.

In Example 16, the subject matter of Example 15 includes, wherein the indication of the orientation of the stress field includes a maximum horizontal stress orientation.

In Example 17, the subject matter of Example 16 includes, using the maximum horizontal stress orientation to determine an optimal orientation of a lateral section of the horizontal well.

In Example 18, the subject matter of Examples 15-17 includes, D temperature model.

In Example 19, the subject matter of Example 18 includes, D temperature model.

In Example 20, the subject matter of Examples 18-19 includes, identifying one or more tensile fractures created during stimulation treatment using an acoustic image log or a resistivity image log of the horizontal well.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A method comprising:

generating a 3D geologic model and a 3D temperature model of a horizontal well;

receiving an indication of an orientation of a stress field in the horizontal well;

drilling the horizontal well using the 3D geologic model, the 3D temperature model, and the indication of the orientation of the stress field, wherein drilling the horizontal well includes optimizing between maintaining laterals normal to a maximum horizontal stress using the indication of the orientation of the stress field and maintaining consistent temperature along the laterals using the 3D temperature model; and iteratively updating the 3D geologic model and the 3D temperature model of the horizontal well based on in-well data.

2. The method of claim 1, wherein the in-well data includes distributed acoustic sensing (DAS) or distributed temperature sensing (DTS) fiber data.

3. The method of claim 1, wherein the indication of the orientation of the stress field includes the maximum horizontal stress orientation.

4. The method of claim 3, further comprising, using the maximum horizontal stress orientation to determine an optimal orientation of a lateral section of the horizontal well.

5. The method of claim 1, further comprising, generating an acoustic image log or a resistivity image log of the horizontal well.

6. The method of claim 5, further comprising, identifying one or more tensile fractures created during stimulation treatment using the acoustic image log or the resistivity image log of the horizontal well.

7. At least one non-transitory machine-readable medium including instructions, which when executed by processing circuitry, cause the processing circuitry to perform operations including:

generating a 3D geologic model and a 3D temperature model of a horizontal well;

receiving an indication of an orientation of a stress field in the horizontal well;

drilling the horizontal well using the 3D geologic model, the 3D temperature model, and the indication of the orientation of the stress field, wherein drilling the horizontal well includes optimizing between maintaining laterals normal to a maximum horizontal stress using the indication of the orientation of the stress field and maintaining consistent temperature along the laterals using the 3D temperature model; and iteratively updating the 3D geologic model and the 3D temperature model of the horizontal well based on in-well data.

8. The at least one non-transitory machine-readable medium of claim 7, wherein the in-well data includes distributed acoustic sensing (DAS) or distributed temperature sensing (DTS) fiber data.

9. The at least one non-transitory machine-readable medium of claim 7, wherein the indication of the orientation of the stress field includes the maximum horizontal stress orientation.

10. The at least one non-transitory machine-readable medium of claim 9, wherein the operations further comprise using the maximum horizontal stress orientation to determine an optimal orientation of a lateral section of the horizontal well.

11. The at least one non-transitory machine-readable medium of claim 7, wherein the operations further comprise generating an acoustic image log or a resistivity image log of the horizontal well.

12. The at least one non-transitory machine-readable medium of claim 11, wherein the operations further comprise identifying one or more tensile fractures created during stimulation treatment using the acoustic image log or the resistivity image log of the horizontal well.

13. A method comprising:

receiving a 3D geologic model and a 3D temperature model of a horizontal well;

receiving an indication of an orientation of a stress field in the horizontal well;

identifying a drill plan for the horizontal well using the 3D geologic model, the 3D temperature model, and the indication of the orientation of the stress field;

iteratively updating the 3D geologic model and the 3D temperature model of the horizontal well based on simulation data using the drill plan, and drilling the horizontal well using an updated drill plan based on the iteratively updated 3D geologic model and the iteratively updated 3D temperature model, wherein drilling the horizontal well includes optimizing between maintaining laterals normal to a maximum horizontal stress using the indication of the orientation of the stress field and maintaining consistent temperature along the laterals using by the iteratively updated 3D temperature model.

14. The method of claim 13, wherein the indication of the orientation of the stress field includes the maximum horizontal stress orientation.

15. The method of claim 14, further comprising, using the maximum horizontal stress orientation to determine an optimal orientation of a lateral section of the horizontal well.

16. The method of claim 13, further comprising identifying one or more tensile fractures created during stimulation treatment using an acoustic image log or a resistivity image log of the horizontal well.

* * * * *